United States Patent
Kapinos et al.

(10) Patent No.: US 12,045,192 B2
(45) Date of Patent: Jul. 23, 2024

(54) SYSTEMS AND METHODS TO CONFIGURE FRONT PANEL HEADER

(71) Applicant: Lenovo (Singapore) Pte. Ltd., Singapore (SG)

(72) Inventors: Robert J. Kapinos, Durham, NC (US); Scott Li, Cary, NC (US); Robert James Norton, Jr., Raleigh, NC (US); Russell Speight VanBlon, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 248 days.

(21) Appl. No.: 17/498,326

(22) Filed: Oct. 11, 2021

(65) Prior Publication Data

US 2023/0112370 A1   Apr. 13, 2023

(51) Int. Cl.
| | |
|---|---|
| *G06F 15/78* | (2006.01) |
| *G06F 1/18* | (2006.01) |
| *G06F 9/4401* | (2018.01) |
| *G06F 13/40* | (2006.01) |
| *G06F 15/177* | (2006.01) |

(52) U.S. Cl.
CPC ...... *G06F 15/7803* (2013.01); *G06F 15/7839* (2013.01); *G06F 1/184* (2013.01); *G06F 1/185* (2013.01); *G06F 9/4411* (2013.01); *G06F 13/4068* (2013.01); *G06F 15/177* (2013.01)

(58) Field of Classification Search
CPC .. G06F 9/4411; G06F 15/177; G06F 13/4068; G06F 1/184; G06F 1/185; G06F 15/7803; G06F 15/7839
USPC .............. 713/1, 100; 710/100, 104; 361/760
See application file for complete search history.

(56) References Cited

U.S. PATENT DOCUMENTS

| | | | | |
|---|---|---|---|---|
| 6,640,271 B2 * | 10/2003 | Ehrenhardt | .......... | G05B 19/042 439/189 |
| 2011/0022826 A1 * | 1/2011 | More | ........................ | G06F 1/26 713/1 |
| 2012/0254598 A1 * | 10/2012 | Mikuszewski | ...... | G06F 9/44505 713/1 |

(Continued)

OTHER PUBLICATIONS

"Pinout", Wikipedia, retrieved on Sep. 9, 2021 from https://en.wikipedia.org/wiki/Pinout.

(Continued)

*Primary Examiner* — Ji H Bae
(74) *Attorney, Agent, or Firm* — John M. Rogitz; John L. Rogitz

(57) ABSTRACT

In one aspect, a device may include at least one processor programmed with instructions to power on the device responsive to an electrical connection of two pins on a front panel header of a system board and, based on powering on the device responsive to the electrical connection of two pins on the front panel header of the system board, present a basic input/output system (BIOS) setup screen on a display. The BIOS setup screen may provide one or more options for a person to configure pinouts of the front panel header. The processor may also be programmed with instructions to save the person's configuration of the pinouts of the front panel header based on user input using the BIOS setup screen and, responsive to a subsequent startup of the device, apply the configuration of the pinouts of the front panel header for operation of the device.

20 Claims, 5 Drawing Sheets

(56) References Cited

U.S. PATENT DOCUMENTS

| | | | |
|---|---|---|---|
| 2014/0075066 A1* | 3/2014 | Menard | G06F 1/3243 |
| | | | 710/104 |
| 2014/0105230 A1* | 4/2014 | Kabiry | H02J 7/0042 |
| | | | 370/537 |
| 2017/0315767 A1* | 11/2017 | Rao | G09G 5/006 |
| 2018/0191116 A1* | 7/2018 | Wang | H01R 24/68 |

OTHER PUBLICATIONS

"Scratchpad memory", Wikipedia, retrieved on Sep. 9, 2021 from https://en.wikipedia.org/wiki/Scratchpad_memory.

* cited by examiner

SYSTEMS AND METHODS TO CONFIGURE FRONT PANEL HEADER

FIELD

The disclosure below relates to technically inventive, non-routine solutions that are necessarily rooted in computer technology and that produce concrete technical improvements. In particular, the disclosure below relates to systems and methods to configure a front panel header of a system board.

BACKGROUND

As recognized herein, configuring front panel headers on modern personal computers can involve a lot of custom engineering based on whatever manufacturer-specific configuration exists or is desired. Because of this, the solutions are messy and furthermore correctly attaching various cables to specific header pins is burdensome, time consuming, and complicated. There are currently no adequate solutions to the foregoing computer-related, technological problem.

SUMMARY

Accordingly, in one aspect a device includes at least one processor programmed with instructions to power on the device responsive to an electrical connection of two pins on a front panel header of a system board and, based on powering on the device responsive to the electrical connection of two pins on the front panel header of the system board, present a basic input/output system (BIOS) setup screen on a display. The BIOS setup screen provides one or more options for a person to configure pinouts of the front panel header. The processor is also programmed with instructions to save the person's configuration of the pinouts of the front panel header based on user input using the BIOS setup screen and, responsive to a subsequent startup of the device, apply the configuration of the pinouts of the front panel header for operation of the device.

In various example implementations, the electrical connection may include a short between the two pins, where the two pins may be two adjacent pins on the front panel header. For example, the device may include the front panel header and the front panel header may include a 2×N pin array where, prior to receipt of the user input and/or subsequent to front panel header reset, any two horizontally and/or vertically adjacent pins in the array may be different such that one adjacent pin is associated with positive voltage and the other adjacent pin is associated with ground.

Also in various example embodiments, the system board may include a motherboard, and the device itself may include the motherboard and the display.

However, the system board may also be a first system board and the instructions may be executed at a second system board different from the first system board The second system board may be located on the device's front control panel, where the front control panel may include the display.

Additionally, in various example embodiments the processor may be programmed with instructions to save the person's configuration of the pinouts of the front panel header in scratchpad memory accessible to the device's BIOS. The scratchpad memory may be established by nonvolatile random-access memory (NVRAM).

In another aspect, a method includes powering on a device responsive to an electrical connection of two pins on a front panel header of a system board. The method also includes, based on powering on the device responsive to the electrical connection of two pins on the front panel header of the system board, presenting a user interface (UI) on a display. The UI includes elements for a person to associate various respective pins of the front panel header with respective functions to establish a pinout configuration. The method also includes saving the pinout configuration based on user input using the UI and, responsive to a subsequent startup of the device, applying the pinout configuration to operate the device in conformance with the pinout configuration.

In various examples, the UI may be a basic input/output system (BIOS) UI.

Also in various examples, the method may include using the device to, prior to receipt of the user input using the UI, detect one or more respective loads sensed at one or more respective pins of the front panel header and recommend via the UI at least one association of a particular pin with a particular function based on a detected load for the particular pin.

Still further, if desired the method may include powering on the device responsive to an electrical connection of a first pin associated with positive voltage and a second pin associated with ground. The first pin may be adjacent to the second pin on the front panel header.

Also if desired, the system board may include a motherboard and the method may be executed at a component of the device other than a component of the motherboard.

Additionally, in some examples the method may include saving the pinout configuration in nonvolatile random-access memory (NVRAM) accessible to the device's basic input/output system (BIOS).

In still another aspect, a device includes a front panel connector that includes a pin array where, prior to receipt of input associating pins of the array with respective device functions, any two horizontally and/or vertically adjacent pins in the array are different such that one adjacent pin is associated with positive voltage and the other adjacent pin is associated with ground.

In some example implementations, the device may be a first device, and respective pins of the pin array may be associable with respective functions of the first device based on communication with a second device different from the first device.

Also in some example implementations, the device may include a system board on which the front panel connector is located, as well as a display and a processor. The processor may be programmed with logic executable to power on the device responsive to an electrical connection of a first pin on the front panel connector that is associated with positive voltage with a second pin on the front panel connector that is associated with ground. The processor may also be programmed with logic executable to present a setup screen on the display based on powering on the device responsive to the electrical connection of the first pin with the second pin. The setup screen may allow a person to associate respective functions of the device with respective pins of the front panel connector. The processor may be further programmed with logic to, based on user input to the setup screen, save the person's association of respective functions of the device with respective pins of the front panel connector and then apply the person's association of respective functions of the device with respective pins of the front panel connector to operate the device responsive to a subsequent startup of the device.

Also in various examples, the pin array may be established by a 2×N array such that the array is two pins wide by N pins long.

The details of present principles, both as to their structure and operation, can best be understood in reference to the accompanying drawings, in which like reference numerals refer to like parts, and in which:

DETAILED DESCRIPTION

Figure 1:
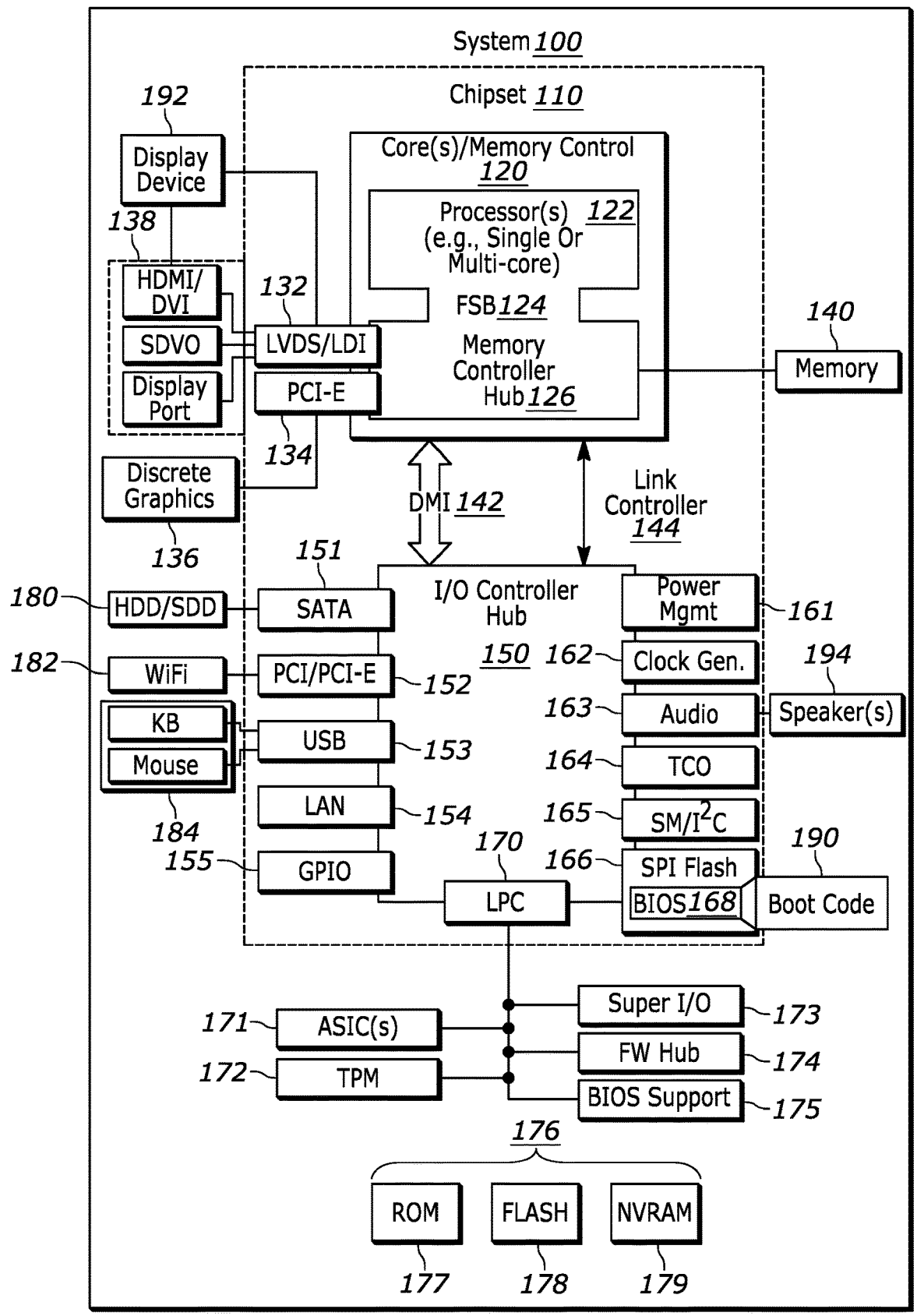
FIG. 1 is a block diagram of an example system consistent with present principles.

Among other things, the detailed description below relates to use of a programmable interface to the on-board front panel connector so that any arrangement of cables that can be physically plugged in can be used.

Prior to delving further into the details of the instant techniques, note with respect to any computer systems discussed herein that a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino CA, Google Inc. of Mountain View, CA, or Microsoft Corp. of Redmond, WA A Unix® or similar such as Linux® operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any general-purpose single- or multi-chip processor that can execute logic by means of various lines such as address lines, data lines, and control lines and registers and shift registers. Moreover, any logical blocks, modules, and circuits described herein can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can also be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may also be embodied in a non-transitory device that is being vended and/or provided that is not a transitory, propagating signal and/or a signal per se (such as a hard disk drive, CD ROM, or Flash drive). The software code instructions may also be downloaded over the Internet. Accordingly, it is to be understood that although a software application for undertaking present principles may be vended with a device such as the system 100 described below, such an application may also be downloaded from a server to a device over a network such as the Internet.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library. Also, the user interfaces (UI)/graphical UIs described herein may be consolidated and/or expanded, and UI elements may be mixed and matched between UIs.

Logic when implemented in software, can be written in an appropriate language such as but not limited to hypertext markup language (HTML)-5, Java/JavaScript, C# or C++, and can be stored on or transmitted from a computer-readable storage medium such as a random access memory (RAM), read-only memory (ROM), electrically erasable programmable read-only memory (EEPROM), a hard disk drive or solid state drive, compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, NC, or a workstation computer, such as the ThinkStation®, which are sold by Lenovo (US) Inc. of Morrisville, NC; however, as apparent from the description herein, a client device, a server or other machine in accordance with present principles may include other features or only some of the features of the system 100. Also, the system 100 may be, e.g., a game console such as XBOX®, and/or the system 100 may include a mobile communication device such as a mobile telephone, notebook computer, and/or other portable computerized device.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled light emitting diode (LED) display or other video display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (×16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more universal serial bus (USB) interfaces 153, a local area network (LAN) interface 154 (more generally a network interface for communication over at least one network such as the Internet, a WAN, a LAN, a Bluetooth network using Bluetooth 5.0 communication, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes basic input/output system (BIOS) 168 and boot code 190.

BIOS may be a set of routines stored in read-only memory that enables a computer to start an operating system and to communicate with the various devices in a system, such as disk drives, keyboards, displays/monitors, printers, and communications ports. In one embodiment, functions performed by BIOS may also be performed by other higher level software application programs. Additionally, in some examples BIOS may be established by a Unified Extensible Firmware Interface (UEFI), which assists in control handoff of a computer system to an operating system during a pre-boot environment (e.g., after the computer system is powered on, but before the operating system starts).

With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing, or reading and writing information on one or more drives 180 such as HDDs, SDDs or a combination thereof, but in any case, the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

Additionally, though not shown for simplicity, in some embodiments the system 100 may include a gyroscope that senses and/or measures the orientation of the system 100 and provides related input to the processor 122, as well as an accelerometer that senses acceleration and/or movement of the system 100 and provides related input to the processor 122. Still further, the system 100 may include an audio receiver/microphone that provides input from the microphone to the processor 122 based on audio that is detected, such as via a user providing audible input to the microphone. The system 100 may also include a camera that gathers one or more images and provides the images and related input to the processor 122. The camera may be a thermal imaging camera, an infrared (IR) camera, a digital camera such as a webcam, a three-dimensional (3D) camera, and/or a camera otherwise integrated into the system 100 and controllable by the processor 122 to gather still images and/or video.

Also, the system 100 may include a global positioning system (GPS) transceiver that is configured to communicate with at least one satellite to receive/identify geographic position information and provide the geographic position information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
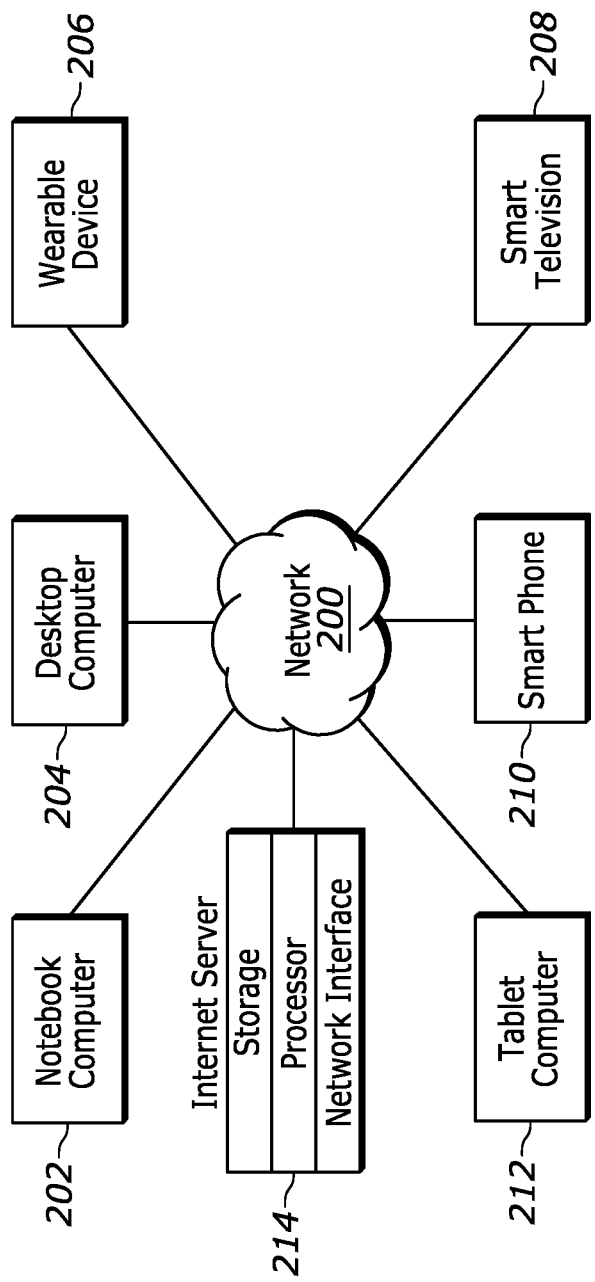
FIG. 2 is a block diagram of an example network of devices consistent with present principles.

Turning now to FIG. 2, example devices that may incorporate components (e.g., system boards) for performing present principles are shown as communicating over a network 200 such as the Internet. It is to be understood that each of the devices described in reference to FIG. 2 may include at least some of the features, components, and/or elements of the system 100 described above and other components described below. Indeed, any of the devices disclosed herein may include at least some of the features, components, and/or elements of the system 100 described above and other components described below.

FIG. 2 shows a notebook computer and/or convertible computer 202, a desktop computer 204, a wearable device 206 such as a smart watch, a smart television (TV) 208, a smart phone 210, a tablet computer 212, and a server 214 such as an Internet server that may provide cloud storage accessible to the devices 202-212. It is to be understood that the devices 202-214 may be configured to communicate with each other over the network 200. However, the present application further recognizes that present principles may particularly apply to all-in-one devices, desktop computers, servers, other stationary systems, or even a laptop computer.

Figure 3:
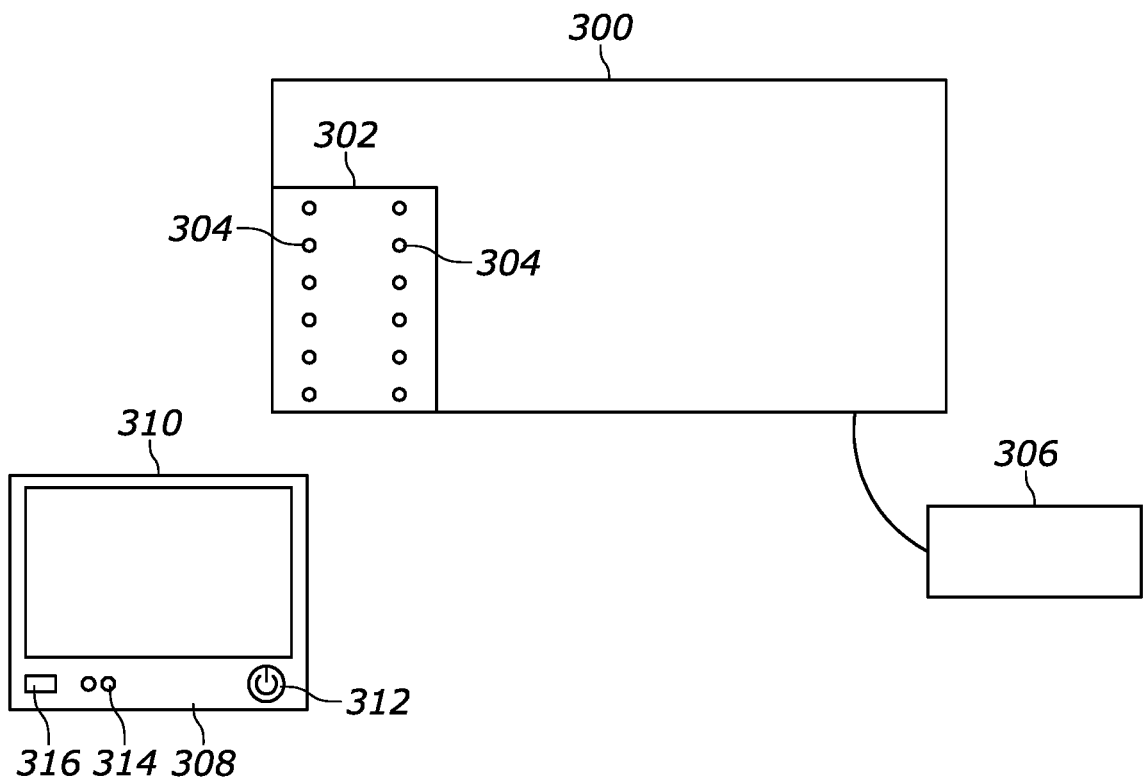
FIG. 3 is a block diagram of an example system board with front panel header and an example front control panel consistent with present principles.

In any case, reference is now made to FIG. 3. FIG. 3 shows an example system board 300 which may be a motherboard such as a personal computer (PC) motherboard or server motherboard in various example implementations. Also note that various motherboard components save for those discussed below have been omitted from FIG. 3 for simplicity.

Accordingly, the board 300 as shown in FIG. 3 may include a front panel header/connector 302 that includes one or more pins 304 arranged in a grid array. FIG. 3 further shows than in some examples, a second system board 306 may be disposed within the same device and may be communicatively coupled to the board 300 via one or more wires for use as set forth further below.

The front panel header 302 on the board 300 may be used for electrically and communicatively connecting the board 300 to a control panel/user interface (UI) 308 on the front of the device. For example, the control panel 308 may be integrated into a housing of the device's electronic display 310 such as an LED display, LCD display, OLED display, etc. The control panel 308 itself may include and/or connect to various components such as a power button 312 to power the device on and off, a reset button, LEDs 314 that can be actuated by the board 300 to indicate various things to an end-user such as hard disk activity, one or more universal serial bus (USB) ports 316 for an end-user to plug USB devices into the USB ports 316 via USB connectors, etc. The header 302 may thus connect to these various components on the control panel 308 via wires (not shown) that run from the control panel 308 on the front of the device to the system board 300, where USB hookups, power switch connectors, LED outputs, and other switches might be located.

Furthermore, consistent with present principles the board 300 may be equipped with circuitries that allow the routing of low voltage, ground, and communication signals between any pin 304 on the header 302 and an electrical component of the front control panel 308 such as those described immediately above. The pins 304 may thus be variable in that any signal for any component/element of the control panel 308 can go between any one of the pins 304 and that respective control panel component using transistors and transistor logic located on the board 300. The present disclosure recognizes that this is possible in part because, regardless of type, the signals in many cases are relatively low-voltage signals that are at least somewhat interchangeable with each other. Thus, the board 300 may allow a signal to be routed to/from any pin 304 through the circuitry on the board 300 that does the routing. However, further note that the logic—transistor or otherwise—may also reside on the secondary board 306 if desired. The secondary board 306 might be located on the control panel 308 itself, for example, though it may be located elsewhere within the device as well. For example, the logic may also reside on a system component other than a system board.

Figure 4:
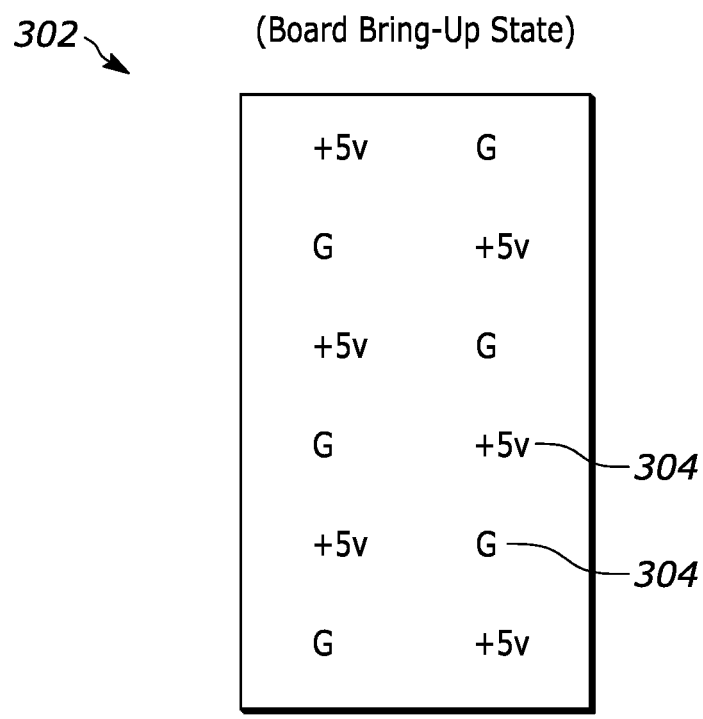
FIG. 4 shows an example diagram of an example starter header pin array/example pinout consistent with present principles.

Also consistent with present principles, to turn on the device the first time prior to pinout configuration of the header 302 (and indeed to configure the pinouts in the first place), since the device might not necessarily know which signal is for which pin, the starter grid array/pinout shown in FIGS. 3 and 4 may be used. In various examples, each pin 304 may be a +5V pin (or other positive voltage pin) or ground pin so that when any +5V pin is electrically connected to a ground pin (e.g., adjacent ground pin), the device will turn on.

As best shown in FIG. 4, in some example implementations the array may be two wide by six (or another integer) long. Accordingly, while the array need not necessarily have a standard number of pins, this 2 pins wide by N pins long layout (2×N) may be used so that two horizontally or vertically adjacent positive/ground pins can be easily shorted. Thus, the device may be turned on in an board bring-up state before any of the pins 304 have been assigned to a specific function for the control panel 308 since shorting any positive voltage pin to a ground pin may send a signal to the board (e.g., through the multiplexer that routes the wires of the pins) to instigate the device to turn on. The device itself may know what state the system is in because it may be initialized to that state the first time in order to provide the starter positive/ground array. The device may thus acknowledge the power on signal to turn on the board 300 and/or device at large for the end-user to subsequently configure/assign different functions to the pins 304 of the header 302.

Note again that connecting any two horizontally or vertically adjacent pins may cause system to turn on the first time a person attempts to do so (or the first time after a system/motherboard reset). The board 302 or 306 may thus present a screen on the display 310 where the user can configure the pins 304 to be associated with various functions depending on how the user wants to plug in the wires from the front control panel 308 to the pins on the board 300 (or has already plugged them in). The screen may then be used for the end-user to configure/assign the pinouts, and the pinout configurations/assignations may then be saved in the device's basic input/output system (BIOS) read-only memory (ROM) on the board 300 (e.g., saved in the BIOS ROM's scratchpad or other nonvolatile random-access memory (NVRAM) or flash memory specifically). Accordingly, the next time the device starts up, the device will have access to the configurations/assignments to know, for example, which pin is the power pin for the power switch so the user can just turn the system on as the user typically would (e.g., simply press the power button).

Thus, in various examples every pin 304 on the board 300, while the board 300 is in the starter configuration, may be assigned to positive voltage (e.g., +5V) or ground (e.g., only during the first board bring-up stage or system reset stage). Then during normal subsequent operation the pins 304 sticking out of the board 300 may send control signals according to their user assignments (and corresponding wired connections) to various components of the front control panel 308.

Accordingly, different pins 304 may be selected at the end-user's choosing to do specific things in the device such as controlling LEDs on the control panel 308 to indicate hard disk status, providing a common ground, sending/receiving power signals based on actuation of the device's power button, controlling audio speakers, etc. The board 300 may thus be adaptable based on end-user preference and without confusing the user so that the user can seamlessly connect pins 304 on the board 300 to the front control panel 308 without unintentionally mismatching connections, which might cause the device to malfunction.

Figure 5:
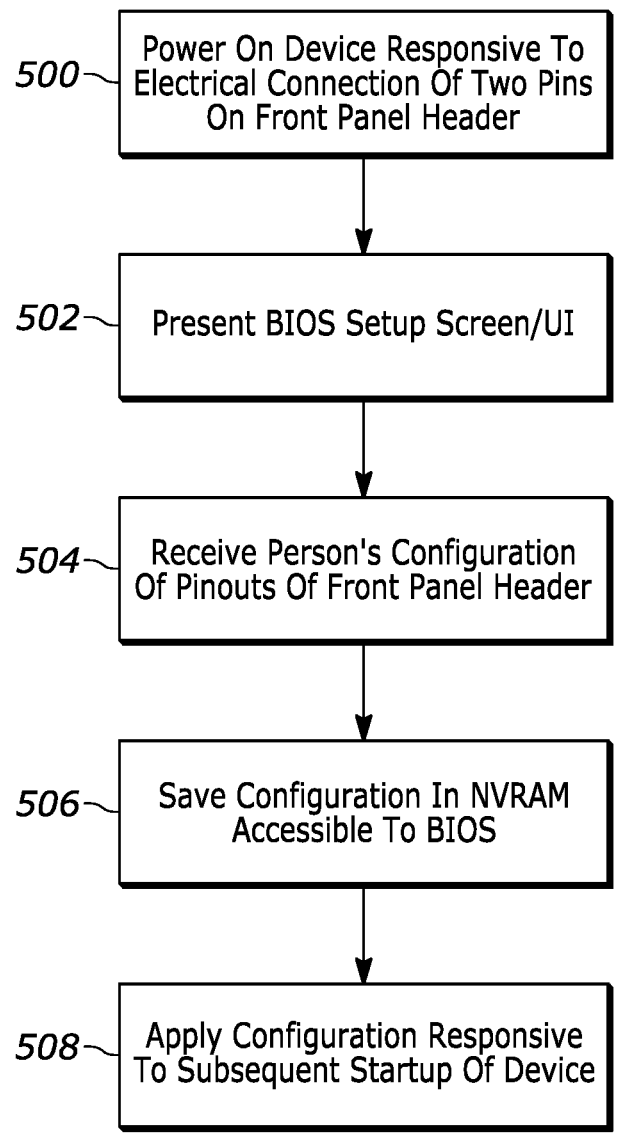
FIG. 5 illustrates example logic in example flow chart format that may be executed by a device consistent with present principles.

Reference is now made to FIG. 5, which shows example logic that may be executed at the board 300, board 306, and/or another system component consistent with present principles. Note that while the logic of FIG. 3 is shown in flow chart format (e.g., in which a processor can execute instructions stored in a non-transitory computer-readable storage medium located on the device), other suitable logic may also be used such as state logic and/or transistor logic using a transistor on the board.

Beginning at block 500, the device may power on responsive to an electrical connection of two pins on a front panel header of a system board as described above (e.g., manual electrical connection by an end-user). The logic may then move to block 502 where, based on powering on the device responsive to the electrical connection of two pins on the front panel header of the system board, the device may present a BIOS setup screen or other graphical user interface (GUI) on the device's connected display. The BIOS setup screen may provide one or more options or other elements for a person to configure pinouts of the front panel header. Thus, through the BIOS setup screen the person may associate various respective pins of the front panel header with respective functions to establish a preferred pinout configuration. An example of such a BIOS setup screen will be described in greater detail later in reference to FIG. 6.

From block 502 the logic may then proceed to block 504 where the device may, based on user input using the BIOS setup screen, save the person's pinout configuration for the front panel header as was input using the BIOS setup screen. Again note that the configuration data may be stored in NVRAM or other storage accessible to the device's BIOS.

Next the logic may move to block 508 where, responsive to a subsequent startup of the device after the configuration data is stored, apply the pinout configuration for the front panel header to operate the device in conformance with the pinout configuration. For example, at block 508 the device's motherboard might control one or more LEDs on the front control panel, power on the device based on receipt of a power on signal generated based on a power button press from the front control panel, etc.

Accordingly, present principles allow a user to ensure he/she can start the device the first time (e.g., after partially assembling it from individual PC parts) even without the pins being assigned to various functions already and without the user being confused by a preestablished configuration of which the user may or may not be aware.

Figures 6, 7:
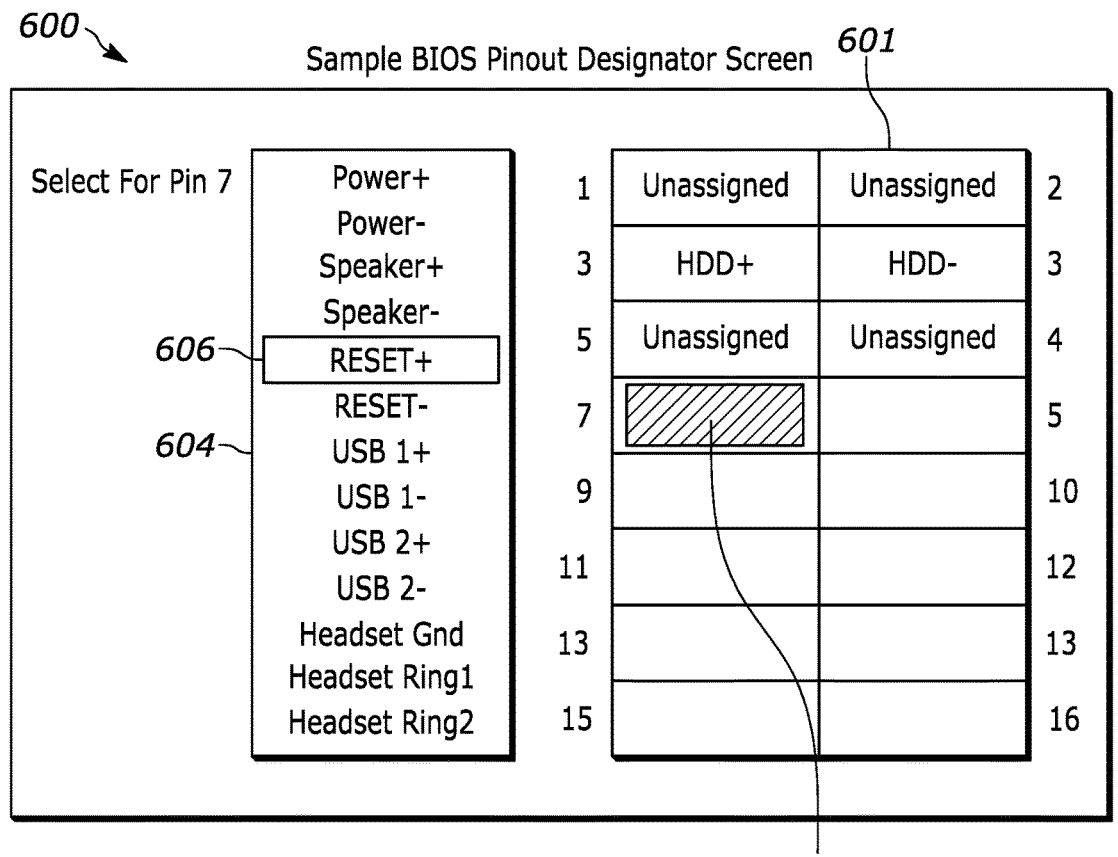
FIG. 6 shows an example BIOS setup screen that may be used consistent with present principles.
FIG. 7 shows an example pinout configured via the BIOS setup screen consistent with present principles.

Continuing the detailed description in reference to FIG. 6, it shows an example BIOS setup screen/UI 600 that may be presented on the display of a device consistent with present principles. As shown, each cell within a manipulable table 601 of the screen 600 may be associated with a given pin on the front panel header itself, whose corresponding pin number is listed next to the respective cell in the table 601. A keyboard or other input device may be used to move a cursor 602 about the table 601 to a given pin position represented by a given cell in the table 601 and the user may then press enter on the keyboard. This in turn may cause another cursor 606 to be presented on the list 604 also forming part of the screen 600 so that a particular function for the selected pin can be selected from the list 604 via up/down buttons and another enter command to thus assign that function to the respective cell highlighted by the cursor 602. In the example shown in FIG. 6, pin 7 has been selected and is in the process of being assigned the reset+ signal/function.

The end-user may thus populate the cells of the table 601 with various functions from the list 604 that are to be associated with/assigned to the corresponding pins on the header itself. Further note that in the example shown, some pins may not have a function assigned to them (e.g., if the user skips that cell while progressing through the table 601 from top to bottom, left to right). An example eventual pinout that might be configured via the setup screen 600 is shown in FIG. 7 and may be uses by the device during subsequent power cycles.

Moving on from FIGS. 6 and 7, note that the user actions set forth herein may be performed not just by homebuild end-users who buy their own individual PC or server parts for home assembly, but also technicians, system administrators, and even device manufacturers.

So, for example, in a factory environment, a manufacturing person could preset the pinout in the BIOS ROM using the principles above when the BIOS ROM is flashed.

Additionally, in some examples the manufacturer may include a pointer in the BIOS to load pinout presets off a certain disk, storage device, or network location to expedite pinout configuration since this may be beneficial in a factory environment where many devices are to be configured in a relatively short amount of time. Thus, a system board operating consistent with present principles may auto-access pinout configuration data from, e.g., external storage or a preprogrammed area.

Also note consistent with present principles that for factory production, software utilities can be created and used to preprogram preferred pinouts in ROM scratchpads for multiple devices. Other methods may also be used for automatic configuration so a technician, e.g., does not need to use the screen 600 for each device being configured at the factory.

Furthermore, regardless of being in a factory or home setting, in some examples a system board may enter a test mode responsive to a pin short as described above and auto-test what system component might already be attached to each pin by determining the loads that have been hooked up to the different pins. For example, the board might determine that a given switch is attached to a certain pin, a speaker is attached to other pins, and that a direct load like an LED is attached to still other pins. A utility or setup screen like the screen 600 may then auto-recommend or auto-assign the pins by populating the table 601 with a best guess for each pin and offer those as suggestions to the user. The table 601 might even gray-out cells for pins that cannot be associated with certain functions based on what the board determines is hooked up to the respective pin. However, there might still be hookups the board might not be able to determine to a sufficient level of confidence, and so one of the cells in the table 601 might be left for a user to define and the cell might just indicate, e.g., "this is a double pole switch" and the user could then associate it with a true/false BIOS setting like turning off USB ports. In any case, in some examples the table 601 of FIG. 6 might be partially or completely pre-filled by the system board with what the system thinks it hooked up to the respective pin.

Also consistent with present principles, the device component executing the logic set forth above might be instantiated as a cabling accessory that plugs into, e.g., a 2-pin board connector that provides the plugs on the other end of the respective wires that run to the pins on the header. The accessory may talk to the BIOS on the motherboard through a single-wire communication bus between the two boards using I2C communication, USB communication, or another communication standard to present the screen 600, configure the pinouts, etc. For example, the secondary board 306 might execute the logic set forth herein. Thus, in some examples the pin programming logic may reside on a sub-board on the front control panel rather than the motherboard and then communicate with the motherboard through the single communication wire.

It may now be appreciated that present principles provide for an improved user interface and improved computer assembly. The disclosed concepts are thus rooted in computer technology for computers to carry out their functions.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged, or excluded from other embodiments.

What is claimed is:

1. A device, comprising:
at least one processor programmed with instructions to:
power on the device responsive to an electrical connection of two pins on a front panel header of a system board;
based on powering on the device responsive to the electrical connection of two pins on the front panel header of the system board, present a basic input/output system (BIOS) setup screen on a display, the BIOS setup screen providing one or more options for a person to specify a configuration of pinouts of the front panel header;
based on user input using the BIOS setup screen, save the configuration of the pinouts of the front panel header; and
responsive to a subsequent startup of the device, apply the configuration of the pinouts of the front panel header for operation of the device.

2. The device of claim 1, wherein the electrical connection comprises a short between the two pins.

3. The device of claim 2, comprising the front panel header, wherein the front panel header comprises a 2×N pin array where, prior to receipt of the user input and/or subsequent to front panel header reset, any two horizontally and/or vertically adjacent pins in the array are different such that one adjacent pin is associated with positive voltage and the other adjacent pin is associated with ground.

4. The device of claim 1, wherein the system board comprises a motherboard.

5. The device of claim 4, comprising the motherboard and the display.

6. The device of claim 1, wherein the system board is a first system board, and wherein the instructions are executed at a second system board different from the first system board.

7. The device of claim 6, wherein the second system board is located on the device's front control panel, the front control panel comprising the display.

8. The device of claim 1, wherein the processor is programmed with instructions to:
save the configuration of the pinouts of the front panel header in scratchpad memory accessible to the device, the scratchpad memory established by nonvolatile random-access memory (NVRAM).

9. A method, comprising:
powering on a device responsive to an electrical connection of two pins on a front panel header of a system board;
based on powering on the device responsive to the electrical connection of two pins on the front panel header of the system board, presenting a user interface (UI) on a display, the UI comprising elements for a person to specify a pinout configuration in which particular pins of the front panel header are associated with respective functions to establish the pinout configuration;
based on user input received via the UI, saving the pinout configuration; and
responsive to a subsequent startup of the device, applying the pinout configuration to operate the device in conformance with the pinout configuration.

10. The method of claim 9, wherein the UI is a basic input/output system (BIOS) UI.

11. The method of claim 9, comprising:
using the device to, prior to receipt of the user input, detect one or more loads sensed at one or more pins of the front panel header and recommend via the UI at least one association of a particular pin with a particular function based on a detected load for the particular pin.

12. The method of claim 9, comprising:
powering on the device responsive to an electrical connection of a first pin associated with positive voltage and a second pin associated with ground.

13. The method of claim 12, wherein the first pin is adjacent to the second pin on the front panel header.

14. The method of claim 9, wherein the system board comprises a motherboard.

15. The method of claim 14, wherein the method is executed at a component of the device other than a component of the motherboard.

16. The method of claim 9, comprising:
saving the pinout configuration in nonvolatile random-access memory (NVRAM) accessible to a basic input/output system (BIOS) of the device.

17. A device, comprising:
a front panel connector, the front panel connector comprising a pin array, the pin array comprising a plurality of pins where, prior to receipt of user input associating different pins of the array with different particular device functions, any two horizontally and/or vertically adjacent pins in the array are different such that one adjacent pin is associated with positive voltage and the other adjacent pin is associated with ground;
a system board on which the front panel connector is located;
a display; and
a processor programmed with logic executable to:
power on the device responsive to an electrical connection of a first pin on the front panel connector that is associated with positive voltage with a second pin on the front panel connector that is associated with ground;
based on powering on the device responsive to the electrical connection of the first pin with the second pin, present a setup screen on the display, the setup screen presenting one or more elements allowing a person to establish a pinout configuration associating different particular functions of the device with different respective pins of the front panel connector;
receive user input to at least one of the one or more elements of the setup screen to establish the pinout configuration, the pinout configuration established according to the associating, using the one or more elements, of different particular functions of the device with different respective pins of the front panel connector;
based on the user input to at least one of the one or more elements of the setup screen to establish the pinout configuration, save the pinout configuration established according to the associating of different particular functions of the device with different respective pins of the front panel connector; and
responsive to a subsequent startup of the device, apply the pinout configuration established according to the associating of different particular functions of the device with different respective pins of the front panel connector to operate the device.

18. The device of claim 17, wherein the device is a first device and wherein the pinout configuration is established based on communication with a second device different from the first device.

19. The device of claim 17, wherein the pin array is established by a 2×N array such that the array is two pins wide by N pins long.

20. The device of claim 17, comprising nonvolatile random-access memory (NVRAM) accessible to the device, wherein the logic is executable to:
save the pinout configuration in the NVRAM.

* * * * *